US008690566B2

(12) United States Patent
Zucchelli

(10) Patent No.: US 8,690,566 B2
(45) Date of Patent: Apr. 8, 2014

(54) ALTERNATING REGENERATIVE FURNACE AND PROCESS OF OPERATING SAME

(75) Inventor: Pietro Zucchelli, Milan (IT)

(73) Assignee: L'Air Liquide, Société Anonyme pour l'Étude et l'Éxploitation des Procédés Georges Claude, Paris (FR)

( * ) Notice: Subject to any disclaimer, the term of this patent is extended or adjusted under 35 U.S.C. 154(b) by 345 days.

(21) Appl. No.: 13/145,918

(22) PCT Filed: Oct. 23, 2009

(86) PCT No.: PCT/EP2009/064021
§ 371 (c)(1),
(2), (4) Date: Oct. 10, 2011

(87) PCT Pub. No.: WO2010/083900
PCT Pub. Date: Jul. 29, 2010

(65) Prior Publication Data
US 2012/0021367 A1   Jan. 26, 2012

(30) Foreign Application Priority Data

Jan. 23, 2009  (EP) ..................................... 09151288

(51) Int. Cl.
F27D 17/00  (2006.01)

(52) U.S. Cl.
USPC .......................................... 432/181; 432/182

(58) Field of Classification Search
USPC ................................................. 432/179–182
See application file for complete search history.

(56) References Cited

U.S. PATENT DOCUMENTS

| 3,515,529 | A |   | 6/1970  | Love et al. |
| 4,496,315 | A |   | 1/1985  | Savolskis |
| 4,496,316 | A | * | 1/1985  | Tsai ................................ 432/30 |
| 4,923,391 | A |   | 5/1990  | Gitman |
| 5,203,859 | A | * | 4/1993  | Khinkis et al. .................. 432/30 |
| 5,571,006 | A |   | 11/1996 | Nakamachi et al. |
| 5,795,364 | A | * | 8/1998  | Payne et al. ..................... 65/158 |
| 5,993,203 | A | * | 11/1999 | Koppang ...................... 432/180 |
| 6,113,389 | A | * | 9/2000  | Joshi et al. .................... 432/180 |
| 6,176,702 | B1 |  | 1/2001  | Mohr et al. |
| 6,261,093 | B1 | * | 7/2001  | Matros et al. ................. 432/181 |
| 6,748,883 | B2 | * | 6/2004  | Solis-Martinez ............. 110/347 |

FOREIGN PATENT DOCUMENTS

| EP | 1 634 856 | 3/2006 |
| FR | 2 892 497 | 4/2007 |

OTHER PUBLICATIONS

International Search Report for PCT/EP2009/064021, mailed Apr. 1, 2010.

* cited by examiner

*Primary Examiner* — Gregory A Wilson
(74) *Attorney, Agent, or Firm* — Christopher J. Cronin

(57) ABSTRACT

Alternating regenerative furnace and process of operating an alternating regenerative furnace, in which during the transition phase in which the respective regenerators switch between heat-recovery mode and pre-heating mode and vice-versa, the regenerator or regenerators which before the transition phase were in heat-recovery mode inject a mixture of flue gas and oxygen-containing gas into the combustion chamber of the furnace, which mixture combusts with fuel injected into the combustion chamber to produce heat.

15 Claims, 4 Drawing Sheets

ALTERNATING REGENERATIVE FURNACE AND PROCESS OF OPERATING SAME

CROSS-REFERENCE TO RELATED APPLICATIONS

This application is a §371 of International PCT Application PCT/EP2009/064021, filed Oct. 23, 2009, which claims §119(a) foreign priority to European Patent Application 09151288.9, filed Jan. 23, 2009.

BACKGROUND

1. Field of the Invention

The present invention relates to an improved method of operating a regenerative furnace and to regenerative furnaces adapted for said method.

2. Related Art

In the operation of a furnace, the heat balance is highly important. Many processes, installations and devices have been developed to improve the furnace heat balance, in particular by means of the recovery of heat from the flue gas leaving the combustion chamber of the furnace.

An example of such an installation for improving the furnace heat balance is the regenerative furnace, which is widely used in industry, in particular in case of continuously working furnaces.

Regenerative furnaces are equipped with a number of regenerators, each regenerator being connected to the combustion chamber of the furnace via its regenerator port. Said regenerators operate alternately as (1) heat-recovery device for the recovery of heat from the flue gas leaving the combustion chamber of the furnace and as (2) pre-heater for preheating the combustion oxidant, typically combustion air, fed to the combustion chamber. This is achieved by means of refractory material present in each of the regenerators.

When a regenerator operates as heat-recovery device, i.e. when the regenerator is in a heat-recovery mode, hot flue gas from the combustion zone enters the regenerator via its regenerator port.

The hot flue gas flows through the regenerator, thereby heating the refractory material present in the regenerator, and leaves the regenerator as cool flue gas via the regenerator outlet.

When a regenerator operates as pre-heater, i.e. when the regenerator is in a pre-heating mode, cool combustion oxidant enters the regenerator via the regenerator inlet. The cool combustion oxidant flows through the regenerator and is heated by heat exchange with the refractory material present in the regenerator, which refractory material has been heated in an earlier heat-recovery mode of the regenerator. Preheated or "hot" combustion oxidant is then supplied by the regenerator or regenerators operating in pre-heating mode, and combusts, or in other words burns, with fuel injected in the combustion chamber by one or more burners or fuel injectors.

Said burners or fuel injectors are generally situated in the vicinity of the regenerator ports, typically underneath the individual regenerator ports.

(a) When the temperature of the cool flue gas leaving the regenerator or regenerators operating in heat-recovery mode reaches a predetermined upper limit;
(b) when the temperature of the hot combustion oxidant leaving the regenerator or regenerators operating in pre-heating mode reaches a predetermined lower limit; or
(c) when the duration of the heat-recovery mode or of the pre-heating mode of a given regenerator or set of regenerators reaches a predetermined length of time, the operation of the regenerators is reversed:
the regenerator or regenerators which have been operating in heat-recovery mode are switched to operation in pre-heating mode as described above, and
the regenerator or set of regenerators which have been operating in pre-heating mode are switched to operation in heat-recovery mode as described above.

In this manner, an improved energy balance is maintained throughout the operation of the furnaces.

Such a process is also known as a reverse firing process or operation.

It is a problem with known regenerative furnaces that, immediately following the reversal of the operation of the regenerators, no combustion oxidant is in fact supplied by the regenerators to the combustion chamber. Indeed, on the one hand, (1) the regenerator or set of regenerators which before the reversal were in the pre-heating mode, no longer supply combustion oxidant to the combustion chamber and instead receive flue gas from the combustion chamber, whereas, on the other hand, (2) before supplying hot combustion oxidant to the combustion chamber, the regenerator or set of regenerators, which before the operation reversal were in the heat-recovery mode, supply, during a limited transition period, to the combustion zone flue gas which filled or was present inside this regenerator or set of regenerators before the operation reversal. This particular stage in the operation of a regenerative furnace is hereafter referred to as "transition phase".

As the flue gas injected into the combustion chamber during the transition phase cannot adequately sustain combustion in the combustion chamber, no fuel is normally injected into the combustion chamber during this phase. The heat generation in the combustion chamber is thus reduced or even interrupted during said transition phase every time the operation of the regenerators is reversed, with a corresponding reduction in the productivity of the furnace.

For example, in a continuous regenerative glass-melting furnace with a pull rate of 50000 kg glass per day, in which reversal of the operation of the regenerators takes place every 17 to 22 minutes with a transition phase of 40 to 60 seconds per operation reversal, heat generation in the combustion chamber is reduced or interrupted during 3 to 5% of the overall furnace operation time with a corresponding negative effect on the pull rate of the furnace.

SUMMARY OF THE INVENTION

It is an object of the present invention to overcome said disadvantage of prior art regenerative furnaces and to reduce or even eliminate the negative effect of the transition phases on the heat generation in the combustion chamber of the furnace.

Thereto, the present invention proposes a process of operating an alternating regenerative furnace, said regenerative furnace comprising:
a combustion chamber,
a first set of one or more regenerators,
a second set of one or more regenerators, and
one or more fuel injectors for injecting fuel into the combustion chamber.

The process of the invention comprises a first operation phase, a second operation phase and a transition phase.

In the first operation phase: (a) the regenerator or regenerators of the first set are in pre-heating mode and preheat cool combustion oxidant and inject hot combustion oxidant into the combustion chamber, (b) fuel is injected into the combustion chamber by at least one of the one or more fuel injectors and combusts with said hot combustion oxidant to produce heat and hot flue gas and (c) hot flue gas flows from the combustion chamber into the regenerator or regenerators of the second set which are in heat-recovery mode, and said flue gas leaves said regenerator or regenerators of the second set as cool flue gas.

In the second operation phase (a) the regenerator or regenerators of the second set are in pre-heating mode and preheat cool combustion oxidant and inject hot combustion oxidant into the combustion chamber, (b) fuel injected into the combustion chamber by at least one of the one or more fuel injectors combusts with said hot combustion oxidant to produce heat and hot flue gas and (c) hot flue gas flows from the combustion chamber into the regenerator or regenerators of the first set which are in heat-recovery mode, and said flue gas leaves said regenerator or regenerators of the first set as cool flue gas.

In the transition phase which occurs between successive first and second operation phases and between successive second and first operation phases, (a) the regenerator or regenerators which, before the transition phase, were in heat-recovery mode inject flue gas into the combustion chamber and (b) flue gas flows from the combustion chamber into the regenerator or regenerators which, in the operation phase before the transition phase were in preheating mode.

It is a particular feature of the process of the present invention that, during the transition phase, (i.e the time necessary to evacuate the flue gas from the regenerator(s) and start to preheat combustion oxidant):

(a) fuel is injected into the combustion chamber by at least one fuel injector of the one or more fuel injectors contrary to the conventional process in which no fuel is injected into the furnace during this phase, and (b) the regenerator or regenerators which, in the operation phase directly before the transition phase were in heat-recovery mode inject a mixture of flue gas and oxygen-containing gas into the combustion chamber, the mixture having an oxygen content capable of sustaining combustion of the fuel so that, during the transition phase, the fuel injected by the at least one fuel injector, combusts with the mixture to produce heat and flue gas in the combustion chamber.

The mixture which is injected during the transition phase thus acts as an oxidizer or as "synthetic air" for fuel combustion during the transition phase so that heat generation is maintained in the combustion chamber during said phase.

It is known in the art to use regenerative furnaces having multiple firing ports which are positioned on opposite sides or ends of the furnace combustion chamber, whereby each of the firing ports contains one or more burners for delivery of fuel into the combustion chamber. The firing ports also provide a combustion air supply around the burners. During furnace operation, the burners on one side (fire side) of the combustion chamber are fired, whereas cooling air is delivered to the burners on the opposite side (off side) of the combustion chamber to prevent damage to the burners. This cooling air is delivered through central lances positioned in each of the burners.

This cooling air is entrained with the flue gas entering the off-side regenerators via said port. However, the amount of cooling air which is thus mixed with the flue gas is insufficient for the mixture to be capable of sustaining fuel combustion upon phase reversal.

The regenerators of the first and second set typically comprise:

a first end having a regenerator port connecting the regenerator to the combustion chamber, a second end having a cool oxidant inlet and a cool flue gas outlet, and a gas permeable bed of refractory material positioned between the first and the second end.

The mixture of flue gas and oxygen-containing gas is then preferably produced at the end of the operation phase which immediately precedes the transition phase, by injecting oxygen-containing gas in the first end of the regenerator or regenerators which are in heat-recovery mode. This oxygen-containing gas then mixes with the hot flue gas which flows from the combustion chamber into said regenerator or regenerators and fills the bed of the refractory material of said regenerator or regenerators. In the transition phase which follows, said regenerator or regenerators inject the mixture of hot flue gas and oxygen-containing gas into the combustion chamber and after said transition phase, said regenerator or regenerators enter the pre-heating mode and inject hot combustion oxidant into the combustion chamber.

It is, in principle, also possible at the end of the operation phase which immediately precedes the transition phase, to fill the regenerator or set of regenerators which are in heat-recovery mode with oxygen-containing flue gas by operating the combustion chamber, at least at said end of the operation phase, with an excess of oxygen, so that the flue gas which leaves the combustion chamber and flows into said regenerator or set of regenerators still contains sufficient oxygen to support combustion and therefore heat generation in the combustion chamber during the transition phase (when said oxygen-containing flue gas leaves said regenerator or set of regenerators and flows back into the combustion chamber). Such an excess of oxygen in the combustion chamber can be achieved in different ways, including the addition of an oxygen-containing gas to the combustion oxidant in the regenerator or set of regenerators which are in preheat mode or in their regenerator ports so as to enrich the combustion oxidant with oxygen, or the addition of oxygen-containing gas directly to the furnace atmosphere.

When the first end of the regenerators of the first and second set comprises a mixing zone between the bed of refractory material and the regenerator port, the mixture of flue gas and oxygen-containing gas can also be produced by, during the transition phase, injecting oxygen-containing gas into said mixing zone of the first end of the regenerator or regenerators which in the operation phase immediately before the transition phase were in pre-heating mode. Said oxygen-containing gas mixes with the flue gas injected by said regenerator or regenerators into the combustion chamber during the transition phase.

The mixing zone is typically a free space in the first end of the regenerators in which the flue gas and the oxygen-containing gas mix. Said mixing zone may also be equipped with static or dynamic diffusers or mixers for increasing the homogeneity of the mixture of flue gas and oxygen-containing gas.

It is an advantage of the present invention that existing regenerator designs already include such a free space in the first end, so that no expensive changes to the structure of such regenerators are necessary for the implementation of the present process.

A further advantageous possibility is to produce the mixture of flue gas and oxygen-containing gas by, during the transition phase, injecting oxygen-containing gas into the regenerator port of the regenerator or regenerators which in the operation phase immediately before the transition phase were in heat-recovery mode, whereby said oxygen-containing gas mixes with the flue gas injected by said regenerator or regenerators into the combustion chamber during the transition phase.

The following may be noted with respect to those embodiments of the present invention in which oxygen-containing gas is injected into a mixing zone or into the regenerator port of a regenerator or set of regenerators during the transition phase:

(a) If the flow of cool combustion oxidant into the regenerator or set of regenerators via their cool combustion oxidant inlets is kept substantially equal during the transition phase and during the subsequent phase in which said regenerator or set of regenerators are in the pre-heating mode, the injection of said oxygen-containing gas into the mixing zone or regenerator port of said regenerator or set of regenerators during the transition phase will lead to a higher gas flow (i.e. a higher volumetric flow rate) into the combustion chamber during the transition phase (injection of the mixture the oxygen-containing gas and of flue gas displaced by the combustion oxidant entering the regenerator or set of regenerators via their cool combustion oxidant inlets) compared to the gas flow (i.e. volumetric flow rate) during the phase which immediately follows said transition phase and during which said regenerator or set of regenerators inject hot combustion oxidant displaced by the cool combustion oxidant entering the regenerator or set of regenerators via their cool combustion oxidant inlet. This also leads to higher flow of flue gas from the combustion chamber to the regenerator or set of regenerators which are in heat-recovery mode during the transition phase as compared to during the subsequent phase. Such a change in gas flow rates into and out of the combustion chamber may produce unwanted temporary and generally limited effects on the heat generation and transfer in the combustion chamber or in the equipment downstream of the regenerators.

(b) According to an advantageous embodiment of the present invention, the flow (volumetric flow rate) of the mixture of flue gas and oxygen-containing gas from a regenerator or set of regenerators into the combustion chamber during the transition phase is substantially equal to the flow (i.e. volumetric flow rate) of hot combustion oxidant into the combustion chamber from said regenerator or set of regenerators during the subsequent phase in which said regenerator or set of regenerators are the pre-heating mode (the two volumetric gas flow rates being expressed as gas flow rates at identical gas temperature and pressure). This reduces or eliminates the effects on the heat generation and transfer in the combustion chamber which may result from variations in gas flow rates into and out of the combustion chamber between the transition phase and the subsequent phase as described above and maintains an even gas flow in the equipment downstream of the regenerators. In particular, it is possible, in accordance with the present invention, to achieve a flow (volumetric flow rate) of the mixture of flue gas and oxygen-containing gas from a regenerator or set of regenerators into the combustion chamber during the transition phase which is substantially equal to the flow (i.e. volumetric flow rate) of hot combustion oxidant into the combustion chamber from said regenerator or set of regenerators during the subsequent phase in which said regenerator or set of regenerators are the pre-heating mode, by adjusting the inflow of cool combustion oxidant into said regenerator or set of regenerators during the transition phase compared to the inflow of cool combustion oxidant into said regenerator or set of regenerators during the phase which immediately follows said transition phase.

Of course, the quantity and nature of oxygen-containing gas can be decided and optimized for each furnace.

The mixture of flue gas and oxygen-containing gas preferably has an oxygen content substantially equal to the oxygen content of the combustion oxidant. This enables a more even combustion and heat production in the combustion chamber throughout the operation of the furnace.

It may, however, be opportune, in accordance with the invention, for the mixture to have an oxygen content which is not identical to the oxygen content of the combustion oxidant. For example, when the combustion oxidant is air or oxygen-enriched air consisting essentially of nitrogen and oxygen, the flue gas will contain nitrogen and combustion products such as water vapour and $CO_2$. The presence of these combustion products in the mixture of flue-gas and oxygen-containing gas may affect the properties of the combustion (such as temperature, radiation, etc) during the transition phase compared to the combustion properties obtained with the combustion oxidant (as occurs during the first and second phase), and the oxygen content of the mixture may be adjusted to obtain largely similar combustion properties during the transition phase and the subsequent phase.

The difference between the oxygen content of the mixture and the oxygen-content of the combustion oxidant advantageously is no more than 7% vol $O_2$, preferably no more than 5% vol $O_2$ and more preferably no more than 3% vol $O_2$.

The combustion oxidant may be air. The combustion oxidant may also be oxygen-enriched air.

The furnace may be an end-ports furnace, whereby the regenerators are positioned at one end of the furnace.

The furnace may also be a side-ports furnace, having one or more regenerators on each lateral side of the furnace.

The process of the invention is particularly useful for use in a glass-melting furnace in which raw glass-making material is melted in the combustion chamber to form molten glass, and for use in a metal melting furnace, for example an aluminium-melting furnace, in which solid metal-containing material is melted to form molten metal.

An alternating regenerative furnace specifically adapted for use in the above process according to the invention comprises a combustion chamber, a first set of one or more regenerators, a second set of one or more regenerators, and one or more fuel injectors for injecting fuel into the combustion chamber.

The regenerators of the first and second set comprise:
 a first end having a regenerator port connecting the regenerator to the combustion chamber,
 a second end having a cool combustion oxidant inlet and a cool flue gas outlet,
 a gas permeable bed of refractory material positioned between the first end and the second end,
and furthermore injectors for injecting oxygen-containing gas into the first end of said regenerators.

The first end of the regenerators of the first and second set advantageously comprises a mixing zone between the bed of refractory material and the regenerator port and the regenerators comprise an injector for injecting oxygen-containing gas into said mixing zone.

The regenerators of the first and second set can also comprise an injector for injecting oxygen-containing gas into the regenerator ports of said regenerators.

According to one embodiment of the invention, the injectors for injecting oxygen-containing gas into the first end of the regenerators or in the regenerator ports so as to obtain the mixture of flue gas and oxygen-containing gas are only used for this purpose. However, a limited flow of gas may be made to flow through said injectors when they are not active, so as to provide the necessary cooling.

According to an advantageous embodiment of the process according to the invention, the injectors for injecting oxygen-containing gas into the first end of the regenerators or into the regenerator ports so as to obtain the mixture of flue gas and oxygen-containing gas are, in the phase following the transition phase, used for oxygen-enrichment of the hot combustion oxidant in the phase following said transition phase.

Alternating regenerator furnaces equipped with injectors for oxygen-containing gas into the first end of a regenerator or into regenerator ports are known from, for example, U.S. Pat. No. 4,496,316 and U.S. Pat. No. 4,496,315, where they are used in processes which differ from the present invention and which do not provide a solution for the problem of reduced heat generation in the combustion chamber during the transition phase.

The furnace according to the invention may in particular be an end-ports alternating regenerative furnace or a side-ports alternating regenerative furnaces.

The following advantages of the present invention can be noted.

By maintaining fuel combustion inside the combustion chamber 10 throughout the operation of the furnace, heat flux to the charge within the furnace, e.g. a glass or aluminium batch, is increased. This can furthermore be achieved without increasing the temperature in the furnace and in particular, without increasing the temperature of the refractory materials of the furnaces, e.g. the furnace roof. The increase in heat flux leads to an increase in productivity or pull rate of the furnaces.

Generally speaking, fixed furnace costs are the main factor of furnace operation costs. For example, in the case of glass-melting furnaces, fixed costs amount to ¾ of the total costs. Consequently, cost efficiency of production is achieved, even if oxygen or oxygen enriched air is used as oxygen-containing gas.

The present invention does not lead to a significant change in flame geometry in the furnace. There is no significant change in hot spot position and consequently reliable furnace operation is maintained.

Due to the continued fuel combustion, the heat flux is more uniform, leading to a reduction in thermal stress on the refractory walls and roof of the furnace and a longer furnace life.

The additional installation costs linked to the invention are minor.

Furthermore, the injectors for injecting oxygen-containing gas can also be used for oxyboosting, for example to maintain a high productivity when some of the regenerators show a loss of performance, e.g. due to aging or fouling.

BRIEF DESCRIPTION OF THE FIGURES

The advantages of the present invention are illustrated in more detail in the example hereafter in the field of glass-melting furnaces, reference being made to the enclosed FIGS. 1 to 7.

DETAILED DESCRIPTION OF THE INVENTION

Figure 1:
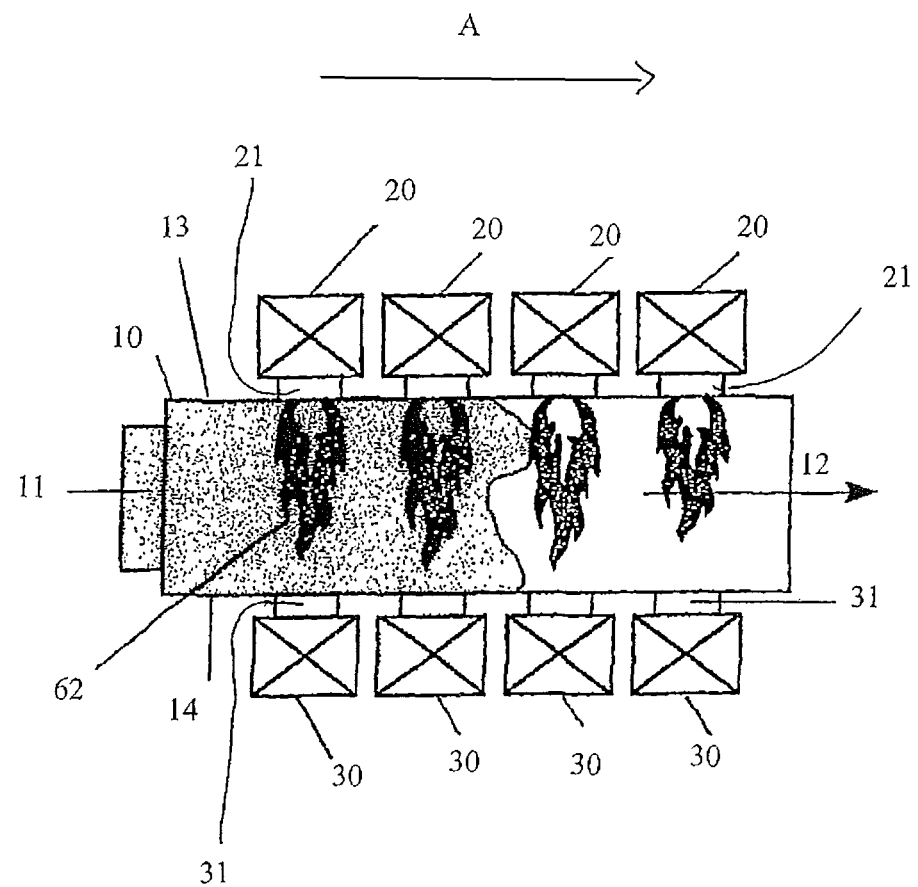
FIG. 1 is a schematic top view of a continuously operated regenerative glass-melting furnace with regenerators on both lateral sides of the furnace (side-ports furnace).

The regenerative glass-melting furnace shown in FIG. 1 comprises a raw material inlet 11 at the upstream end of combustion chamber 10 and a molten glass outlet 12 at the downstream end of the combustion chamber 10.

A first set of regenerators 20 is positioned on the left-hand side 13 of the combustion chamber 10 (when seen in the upstream-downstream direction A of the furnace), and a second set of regenerators 30 is positioned on the right-hand side 14 of the combustion chamber 10, so that the regenerator port 21 of the regenerators 20 of the first set are positioned opposite the regenerator ports 31 of the regenerators 20 of the second set.

A first set of fuel injectors 40 is mounted in the left-hand lateral wall 13 of the combustion chamber 10, each fuel injector 40 of the first set is positioned directly below a regenerator port 21 of a regenerator 20 of the first set of regenerators. Likewise, a second set of fuel injectors 50 is mounted in the right-hand side wall 14 of the combustion chamber 10 so that each of said fuel injectors 50 is positioned directly below a regenerator port 31 of a regenerator 30 of the second set of regenerators.

Each regenerator 20,30 contains a cool air inlet and a cool flue gas outlet at the bottom end 22,32 of the regenerator and a regenerator port 21,31 at the top end 23,33 of the regenerator through which the regenerator is in fluid connection with the combustion chamber 10 of the furnace. Each regenerator 20,30 furthermore comprises a gas permeable bed 24,34 of refractory material between the bottom end 22,32 and the top end 23,33 of the regenerator.

The cool combustion air is typically air at ambient temperature. It will be appreciated that in a given regenerator 20,30, the cool air inlet into the regenerator and the cool flue gas outlet out of said regenerator may be separate or may alternatively consist of a single inlet/outlet conduit equipped with a valve for switching from leading cool combustion air into the regenerator to leading cool flue gas out of said regenerator.

Molten glass is produced in the furnace by feeding solid raw material through the inlet 11 in the upstream end of the combustion chamber 10. Heat is generated in the combustion chamber 10 by combusting fuel injected into the combustion chamber 10 by one of the two sets of fuel injectors 40,50 with combustion oxidant supplied to the combustion chamber 10 through the regenerator port 21,31 positioned directly above said fuel injectors 40,50. The heat thus generated in the combustion chamber 10 melts the solid raw material, thus producing molten glass which is evacuated from the combustion chamber 10 via the molten glass outlet 12 at the downstream end of the combustion chamber 10.

Figure 2:
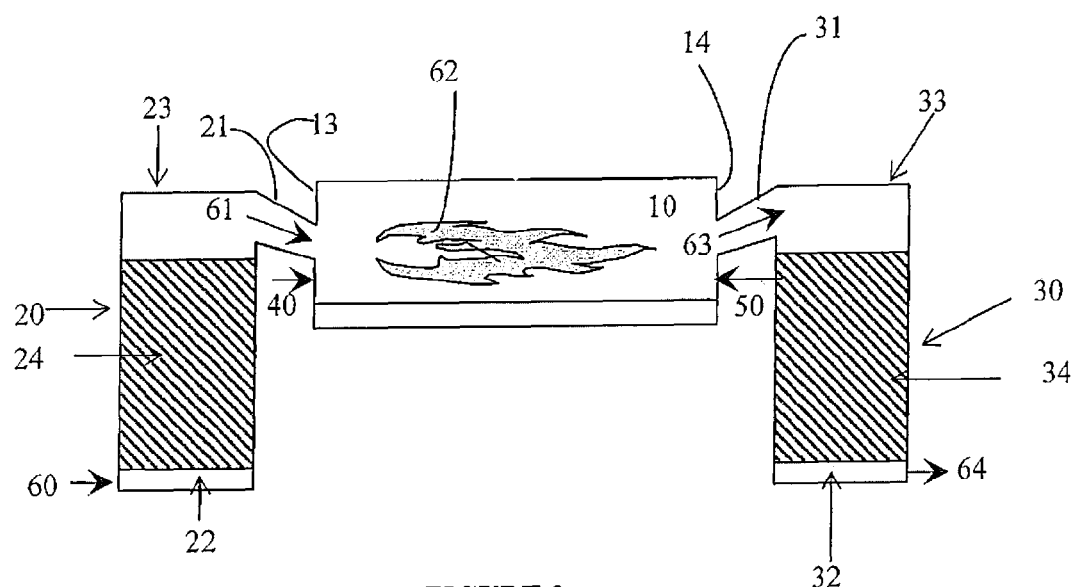
FIG. 2 is a schematic cross-section view along vertical plane II-II of the furnace of FIG. 1 during a first operation phase of the furnace.

During the operation phase of the furnace shown in FIG. 2, the regenerators 20 of the first (left-hand) set are in the preheating mode and the regenerators 30 of the second (right-hand) set are in the heat-recovery mode.

The side of the furnace comprising the regenerators in pre-heating mode is also known as the "fire side" of the furnace, whereas the side comprising the regenerators in heat-recovery mode is known as the "off-side".

Cool combustion air 60 enters the regenerators 20 of the first set through the cool air inlet. The combustion air then flows upwards through the bed 24 of refractory material which has been heated in an earlier heat-recovery mode of the regenerator. The combustion air, which has entered the regenerator 20 at ambient temperature, is thus heated by heat exchange with the bed of refractory material and leaves the bed at a temperature between 1000° C. and 1300° C.

The hot combustion air 61 is injected in the combustion chamber 10 via regenerator port 21. Fuel is injected in the combustion chamber 10 through fuel injectors 40 positioned below said regenerator ports 21.

Inside the combustion chamber 10, the fuel injected by injectors 40 combusts with the hot combustion air to produce flame 62, thus generating heat and hot flue gas in the combustion chamber 10. The hot flue gas 63, having a temperature between 1450° C. and 1600° C., leaves the combustion chamber 10 via the regenerator ports 31 of the regenerators 30 of the second set. Inside regenerator 30, the flue gas flows through the bed 34 of refractory material from the top end 33 to the bottom end 32 of the regenerator 30, thereby heating the bed 34 of refractory material.

The flue gas thereafter leaves the regenerator 30 through the flue gas outlet as cool flue gas 64 at a temperature of about 550° C. to 750° C.

As said phase in the operation of the furnace progresses, the heat content of the bed 24 of refractory material in the regenerators 20 of the first set drops, which in turn leads to a decrease in the temperature of the hot combustion air 61 supplied to the combustion chamber 10 by said regenerators 20.

In order to maintain the efficiency of the heat recovery process sufficiently high, the operation of the furnace is reversed:

(1) when the temperature of the hot combustion air 61 fed to the combustion chamber 10 by the regenerators 20 of the first set drops below a first critical level (predetermined lower limit), which is indicative of an insufficient level of heat recovery;

(2) when the temperature of the cool flue gas 64 leaving the regenerators 30 of the second set is above a second critical level (predetermined upper limit), which indicates that the bed of refractory material 34 has recovered and accumulated sufficient thermal energy for effective pre-heating of cool combustion air; or (3) when the duration of the current phase of operation of the furnace has reached a critical value which has been predetermined (experimentally or through calculation) and which is sufficiently long so that the beds of refractory material of the regenerators 30 of the second set have accumulated sufficient thermal energy for effective pre-heating of cool combustion air and which is sufficiently short so that the temperature of the hot combustion air 61 supplied by the regenerators 20 of the first set has not dropped below the first critical level.

In the present example, it was found that when a phase reversal was programmed to take place every 20 minutes, the hot combustion air supplied by the set of regenerators in pre-heating phase consistently has a temperature between 1000° C. and 1300° C. throughout the operation of the furnace.

Figure 3:
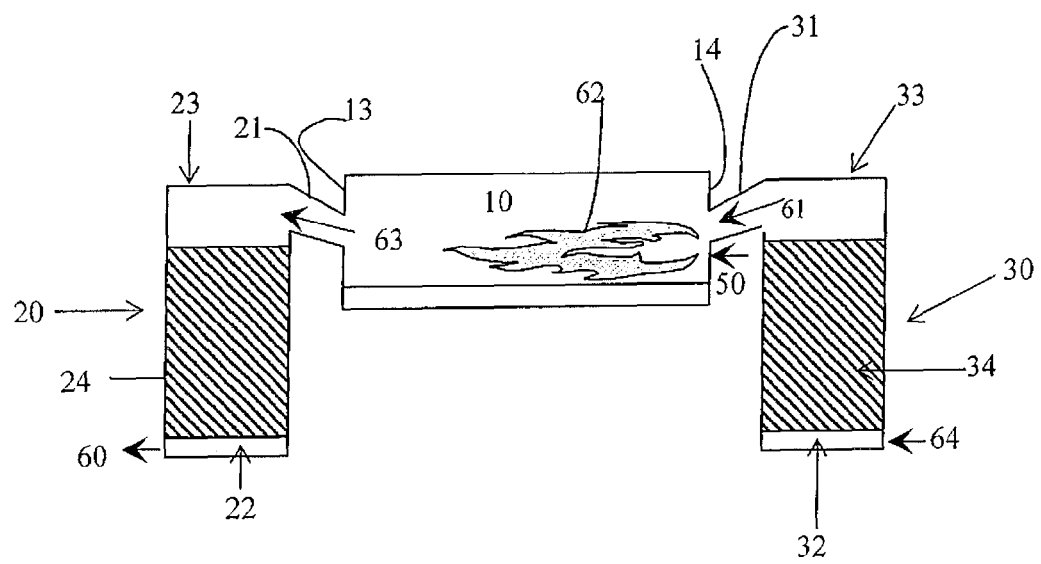
FIG. 3 is a schematic cross-section view along vertical plane II-II of the furnace of FIG. 1 during a second operation phase of the furnace.

After phase reversal, the regenerators 20 of the first (left-hand) set are in heat-recovery mode and the regenerators 30 of the second (right-hand) set are in the pre-heating mode. This is illustrated in FIG. 3.

Example According to the Prior Art

Figure 4:
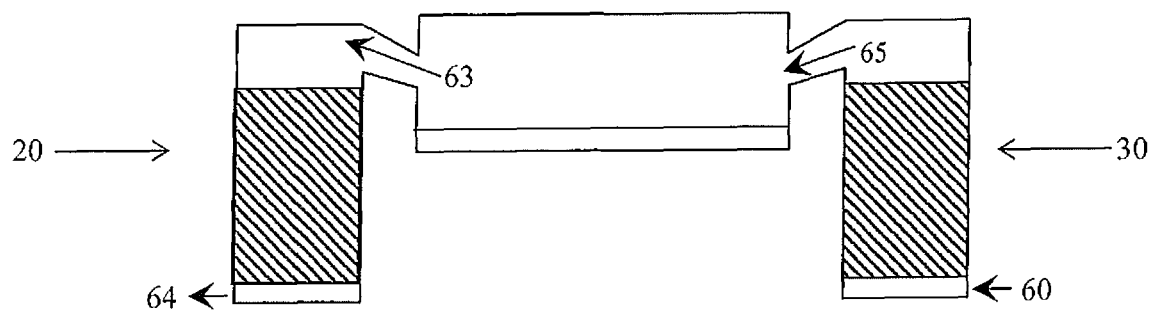
FIG. 4 is a schematic cross-section view along vertical plane II-II of the furnace of FIG. 1 during a transitional phase of the furnace.

In the process according to the prior art, at the end of the first phase (illustrated in FIG. 2) the regenerators 30 of the set of regenerators which are in the heat-recovery mode are filled with flue gas. Consequently, during the transition period of about 50 seconds which immediately follows the phase reversal, the regenerators 30 of the second (right-hand) set, which have now switched to pre-heating, supply to the combustion chamber 10 the flue gas 65 present in said regenerators 30 until said flue gas is replaced by the combustion air which enters said regenerators 30 via their cool air inlet. This is illustrated in FIG. 4.

During the transition period, no combustion air is therefore injected into the combustion chamber 10 in order to sustain the combustion of fuel inside said combustion chamber 10. It is therefore known to interrupt the supply of fuel to the combustion chamber 10 during the transition period or phase. A similar transition period occurs upon reversal of the furnace operation from the second phase (illustrated in FIG. 3) back to the first phase (illustrated in FIG. 2).

First Example

Figure 5:
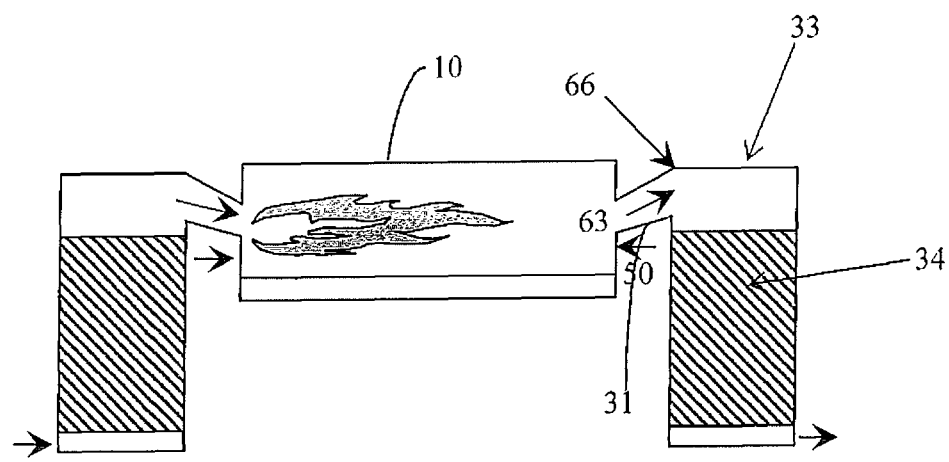
FIG. 5 is a schematic cross-section view along vertical plane II-II of the furnace of FIG. 1 during a final stage of the first operation phase of the furnace.

In a first process according to the present invention, in the final stage of the first phase (during about the final 50 seconds of the first phase), oxygen containing gas 66 is injected into the top end 33 of the regenerators 30 of the second (right-hand) set so as to mix with the flue gas 63 leaving the combustion chamber 10 via the regenerator port 31 of said regenerators 30 and to form a mixture of flue gas and oxygen-containing gas having a constant oxygen content (typically about 21% by volume (% vol) of oxygen). For example, when the oxygen-containing gas injected in the top end of the regenerator has an oxygen concentration of 90% vol, the oxygen-containing gas is injected into the top end of the regenerators during the final stage of the first phase at a ratio of about 0.2 to 0.3 V oxygen-containing gas per 1 V of flue gas entering the regenerator (said volumes of oxygen-containing gas and flue gas being expressed as the volume of the oxygen-containing gas, respectively of the flue gas taken at the same temperature and pressure). This is illustrated in FIG. 5.

Figure 6:
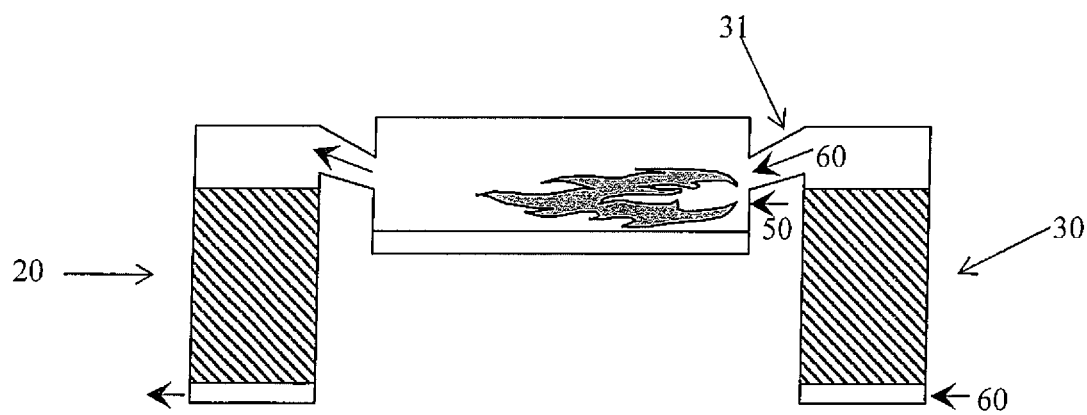
FIG. 6 is a schematic cross-section view along vertical plane II-II of the furnace of FIG. 1 during an operation stage reversal of the furnace.

This mixture of flue gas and oxygen progressively fills the bed 34 of refractory material of the regenerators 30 of the second set. At the moment of operation reversal, the injection of oxygen-containing gas 66 into the top end 33 of the regenerator 30 of the second set is interrupted. At this stage in the process, the regenerators of the second set are entirely filled with said mixture so that immediately following the phase reversal (see FIG. 6), the regenerators 30 of the second set (which are now in pre-heating phase) inject the hot mixture 67 of flue gas and oxygen into the combustion chamber 10 so as to sustain combustion of the fuel injected by the fuel injectors 50 situated below the regenerator port 31 of the regenerators 30 of the second set. Inside said regenerators 30, the mixture of flue gas and oxygen is progressively replaced by combustion air which enters the regenerators via the combustion air inlet of said regenerators 30 so that, at about 50 seconds after the phase reversal, the regenerators 30 of the second set inject hot combustion air 61 into the combustion chamber 10 (as shown in FIG. 3).

A similar procedure is followed for the operation reversal from the second phase to the first phase.

In this manner, an uninterrupted supply of hot combustion oxidant having a constant oxygen content (typically of 21% vol) and capable of sustaining fuel combustion in the combustion chamber 10 is achieved throughout the operation of the furnace.

Thereby, the pull rate of the furnace is increased by 3 to 5%.

Second Example

In an alternative example of the process according to the present invention, the final stage of the first phase is conducted as described in the example according to the prior art (see FIG. 2), so that, at the end of the first phase, the regenerators of the set of regenerators which are in the heat-recovery mode are filled with flue gas.

According to the second example, during the transition period of about 50 seconds which immediately follows the phase reversal, oxygen-containing gas 66 is injected into the top end (or alternatively into the regenerator port 31) of the regenerator or regenerators which, before the phase reversal, were in heat-recovery mode. In the case illustrated in FIGS. 2 and 7, these are the regenerators 30 of the second set.

Figure 7:
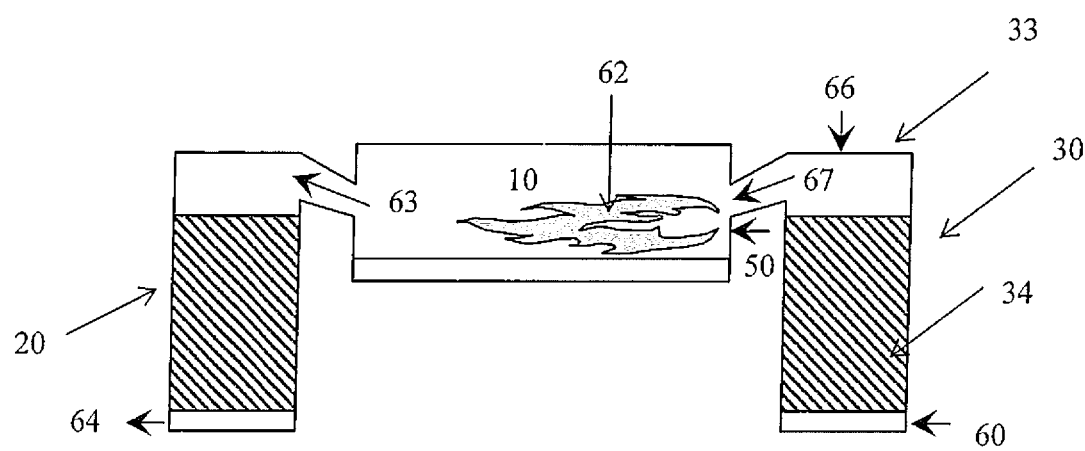
FIG. 7 is a schematic cross-section view along vertical plane II-II of the furnace of FIG. 1 during the transition phase of the furnace where the mixture of flue gas and oxygen-containing gas (injected into the combustion chamber through the regenerator ports of the regenerators of the second set) has a constant oxygen content.

The oxygen-containing gas 66 which, during the transition period, is thus injected into the top end 33 (or alternatively into the regenerator port 31) of said regenerators 30, mixes with the flue gas leaving said regenerators 30 of the second set during the transition period, whereby the amount of oxygen-containing gas 66 injected into the top end 33 (or alternatively into the regenerator port 31) is such that the mixture of flue gas and oxygen-containing gas injected into the combustion chamber 10 through the regenerator ports 31 of the regenerators 30 of the second set has a constant oxygen content (typically about 21% vol of oxygen). This is illustrated in FIG. 7.

At the end of the transition period, when the flue gas in the bed 34 of refractory material of the regenerators 30 of the second set has been replaced by combustion air entering said regenerators 30 via the cool combustion air inlet, and the regenerator ports 31 of the regenerators 30 of the second set start injecting hot combustion air through their regenerator ports 31 into the combustion chamber 10, the injection of oxygen-containing gas 66 into the top end 33 (or regenerator port 31) of said regenerators 30 is halted.

A similar procedure is followed for the operation reversal from the second phase to the first phase.

As was the case for the first example, the process according to the second example enables an uninterrupted supply of hot combustion oxidant having a constant oxygen content (typically of 21% vol) and capable of sustaining uninterrupted fuel combustion in the combustion chamber 10 of the furnace.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process of operating an alternating regenerative furnace, said regenerative furnace comprising:
    a combustion chamber;
    a first set of one or more regenerators;
    a second set of one or more regenerators;
    one or more fuel injectors for injecting fuel into the combustion chamber, the process comprising:
    (i) a first operation phase in which (a) the regenerator or regenerators of the first set are in pre-heating mode and preheat cool combustion oxidant and inject hot combustion oxidant into the combustion chamber, in which (b) fuel injected into the combustion chamber by at least one of the one or more fuel injectors combusts with said hot combustion oxidant to produce heat and hot flue gas and in which (c) hot flue gas flows from the combustion chamber into the regenerator or regenerators of the second set which are in heat-recovery mode, and leaves said regenerator or regenerators as cool flue gas,
    (ii) a second operation phase in which (a) the regenerator or regenerators of the second set are in pre-heating mode and preheat cool combustion oxidant and inject hot combustion oxidant into the combustion chamber, in which (b) fuel injected into the combustion chamber by at least one of the one or more fuel injectors combusts with said hot combustion oxidant to produce heat and hot flue gas and in which (c) hot flue gas flows from the combustion chamber into the regenerator or regenerators of the first set which are in heat-recovery mode, and leaves said regenerator or regenerators as cool flue gas,
    (iii) a transition phase between successive first and second operation phases and between successive second and first operation phases, in which (a) the regenerator or regenerators which, in the operation phase before the transition phase were in heat-recovery mode inject flue gas into the combustion chamber and in which (b) flue gas flows from the combustion chamber into the regenerator or regenerators which, in the operation phase before the transition phase were in preheating mode,
    characterized in that:
        during the transition phase (a) fuel is injected into the combustion chamber by at least one fuel injector of the one or more fuel injectors, and (b), the regenerator or regenerators which, in the operation phase before the transition phase were in heat-recovery mode inject a mixture of flue gas and oxygen-containing gas into the combustion chamber, and
        the mixture has an oxygen content capable of sustaining combustion of the fuel so that the fuel injected by the at least one fuel injectors during the transition phase combusts with the mixture of flue gas and oxygen-containing gas to produce heat and flue gas in the combustion chamber.

2. The process of claim 1, wherein the regenerators of the first and second set comprise:
    a first end having a regenerator port connecting the regenerator to the combustion chamber,
    a second end having a cool combustion oxidant inlet and a cool flue gas outlet, and
    a gas permeable bed of refractory material positioned between the first and the second end.

3. The process of claim 2, wherein the mixture of flue gas and oxygen-containing gas is produced by, at the end of the operation phase which immediately precedes the transition phase, injecting oxygen-containing gas in the first end of the regenerator or regenerators which are in heat-recovery mode so as to mix with the hot flue gas which flows from the combustion chamber into said regenerator or regenerators, and in which the mixture of flue gas and oxygen-containing gas then fills the bed of the refractory material of said regenerator or regenerators.

4. The process of claim 2, wherein the first end of the regenerators of the first and second set comprises a mixing zone between the bed of refractory material and the regenerator port and in which the mixture of flue gas and oxygen-containing gas is produced by, during the transition phase, injecting oxygen containing gas into said mixing zone of the first end of the regenerator or regenerators which in the operation phase immediately before the transition phase were in pre-heating mode, so as to mix with the flue gas injected by said regenerator or regenerators into the combustion chamber during the transition phase.

5. The process of claim 2, wherein said regenerators of the first and second set comprise injectors for injecting oxygen-containing gas into the first end.

6. The process of claim 2, wherein the mixture of flue gas and oxygen-containing gas is produced by injecting, during the transition phase, oxygen-containing gas into the regenerator port of the regenerator or regenerators which in the operation phase immediately before the transition phase were in heat-recovery mode, so as to mix with the flue gas injected by said regenerator or regenerators into the combustion chamber during the transition phase.

7. The process of claim 2, wherein the regenerators of the first and second set comprise injectors for injecting oxygen-containing gas into the regenerator ports of said regenerators.

8. The process of claim 1, wherein the mixture of flue gas and oxygen-containing gas has an oxygen content within 7% vol $O_2$ of the oxygen content of the combustion oxidant, preferably within 5% vol $O_2$ thereof.

9. The process of claim 1, wherein the mixture of flue gas and oxygen-containing gas has an oxygen content substantially equal to the oxygen content of the combustion oxidant.

10. The process of claim 1, wherein the combustion oxidant is air.

11. The process of claim 1, wherein the oxygen-containing gas has an oxygen content of at least 90% vol, preferably of at least 95% vol.

12. The process of claim 1, wherein the furnace is an end-ports furnace.

13. The process of claim 1, wherein the furnace is a side-ports furnace.

14. The process of claim 1, wherein the furnace is a glass-melting furnace in which raw glass-making material is melted in the combustion chamber to form molten glass.

15. The process of claim 1, wherein the furnace is a metal melting furnace, preferably an aluminium-melting furnace, in which solid metal-containing material is melted to form molten metal.

\* \* \* \* \*